US005697134A

United States Patent [19]

Spaulding et al.

[11] Patent Number: 5,697,134

[45] Date of Patent: Dec. 16, 1997

[54] SPRING CLAMP INSERTION TOOL

[75] Inventors: Brent Keith Spaulding; Michael F. Bartol, both of Wind Lake, Wis.

[73] Assignee: Delco Electronics Corp., Kokomo, Ind.

[21] Appl. No.: 714,746

[22] Filed: Sep. 16, 1996

[51] Int. Cl.[6] .......... B23P 19/04

[52] U.S. Cl. .......... 29/225; 29/242; 29/243.56; 29/270

[58] Field of Search .......... 29/225, 230, 242, 29/243.5, 243.56, 267, 270, 283, 283.5

[56] References Cited

U.S. PATENT DOCUMENTS

| | | | |
|---|---|---|---|
| 318,221 | 5/1885 | Thompson et al. | 29/225 |
| 2,540,388 | 2/1951 | Dreeben | 29/225 |
| 3,754,314 | 8/1973 | Snorgrass | 29/225 |
| 5,161,292 | 11/1992 | Kurtyak et al. | 29/267 |

*Primary Examiner*—Timothy V. Eley
*Assistant Examiner*—Lee Wilson
*Attorney, Agent, or Firm*—Mark A. Navarre

[57] ABSTRACT

An electronic circuit having a header and a heat rail on a circuit board requires a spring clamp to hold power components against the heat rail. A tool for applying a high insertion force on the spring clamp comprises a base which attaches to the heat rail and a handle pivotally mounted on the base, the handle including a cam portion positioned over the clamp location. Turning the handle rotates the cam against the clamp to press the clamp into the desired position.

3 Claims, 2 Drawing Sheets

SPRING CLAMP INSERTION TOOL

FIELD OF THE INVENTION

This invention relates to a hand tool and particularly to a tool for assembling a spring clamp to an electronic package.

BACKGROUND OF THE INVENTION

Electronic circuits used in motor vehicles often have substantial power output accompanied by sufficient energy dissipation to require heat sinking capabilities. In one type of power circuit a circuit board carries a header, a heat rail spaced from the header, and power components connected to the circuit board and physically seated on the heat rail. To maintain firm contact between the components and the heat rail to ensure good thermal contact, a spring clamp is inserted in the space between the header and the heat rail to bias the components against the heat rail with substantial force. The spring clamp is in the shape of a wedge and has a strong leaf spring at one side to engage the components.

Installation of the spring clamp to the electronic assembly is carried out by hand. Due to the strong leaf spring, the insertion force is on the order of 40 pounds. Thus manual insertion without the aid of tools is difficult, particularly where many such insertions are required each working day. To ease the insertion a bar has been used to force the spring clamp into place but that proved to be awkward and sometimes parts were damaged. Accordingly, some sort of assembly tool is needed to facilitate the process.

SUMMARY OF THE INVENTION

It is therefore an object of the invention to facilitate easy insertion of a spring clamp into an electronic assembly. Another object is to carry out such spring clamp insertion by a simple hand tool.

An electronic assembly has a heat rail and a header on a circuit board and a spring clamp inserted between them. The spring clamp is a wedge-shaped element with a leaf spring which presses the components against the heat rail. A tool for inserting the spring clamp has a base which attaches to the outer edge of the heat rail by hooking over the top edge and underneath the rail, a cam which pivots on the base and overlies the spring clamp position, and a lever extending from the cam for manually turning the cam. The spring clamp is first positioned above the space between the header and the rail, the tool is fastened to the rail to locate the cam above the clamp, and the handle is turned to force the clamp into place. The cam and lever arrangement afford sufficient mechanical advantage to allow the lever to turn easily during assembly of the clamp.

BRIEF DESCRIPTION OF THE DRAWINGS

The above and other advantages of the invention will become more apparent from the following description taken in conjunction with the accompanying drawings wherein like references refer to like parts and wherein.

DESCRIPTION OF THE INVENTION

Figure 1:
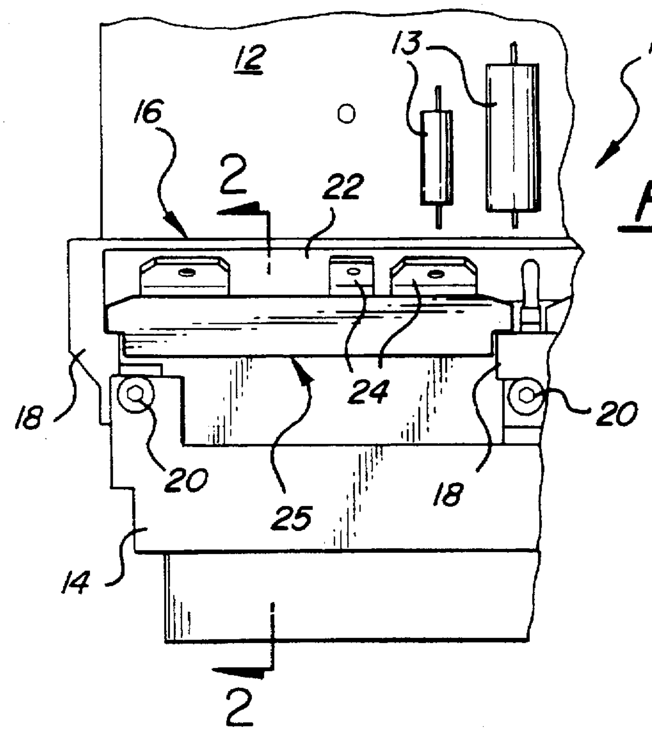
FIG. 1 is a partial plan view of an electronic assembly having a spring clamp.
Figure 2:
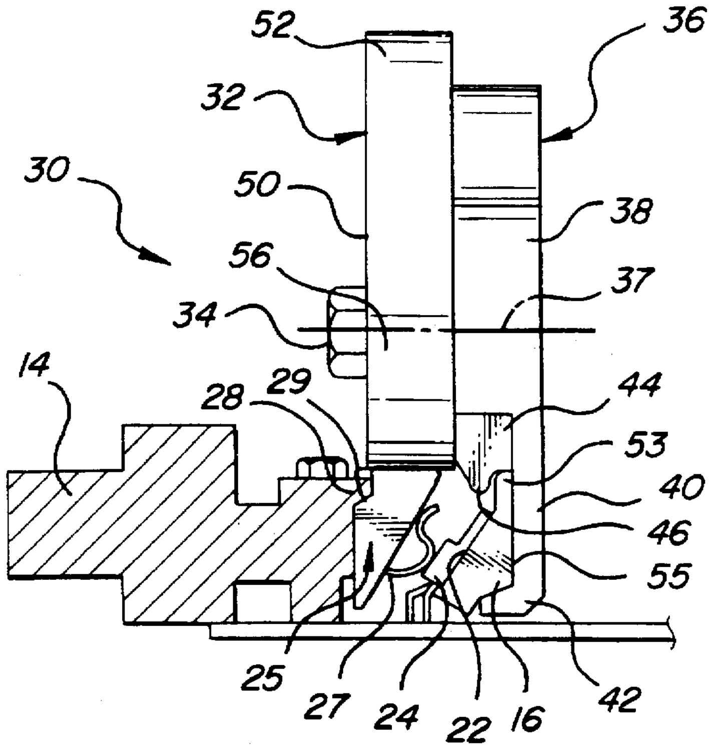
FIG. 2 is a cross section of the assembly of FIG. 1 taken along line 2—2 and including an insertion tool according to the invention.

Referring to FIGS. 1 and 2, an electronic assembly 10 includes a circuit board 12 carrying some components 13 and a support. The support comprises a header 14 mounted to one end of the circuit board and a heat rail 16 also mounted on the circuit board and spaced from the header except for connecting arms 18 attached to the header by bolts 20. The heat rail 16 has a face 22 sloping away from the board 12. Power components 24 mounted on the circuit board lie against the sloping face 22 in thermally conducting relationship for heat dissipation. A spring clamp 25 inserted in the space between the header 14 and the heat rail 16 presses against the components 24 to hold them against the sloping face 22 of the heat rail. The spring clamp 25 includes an elongated wedge-shaped body 26 and a leaf spring 27 which bears against the components 24. A nose portion 28 on the header 14 engages an upper recess 29 in the spring clamp 25 to latch the clamp in place once it is installed.

Figure 3:
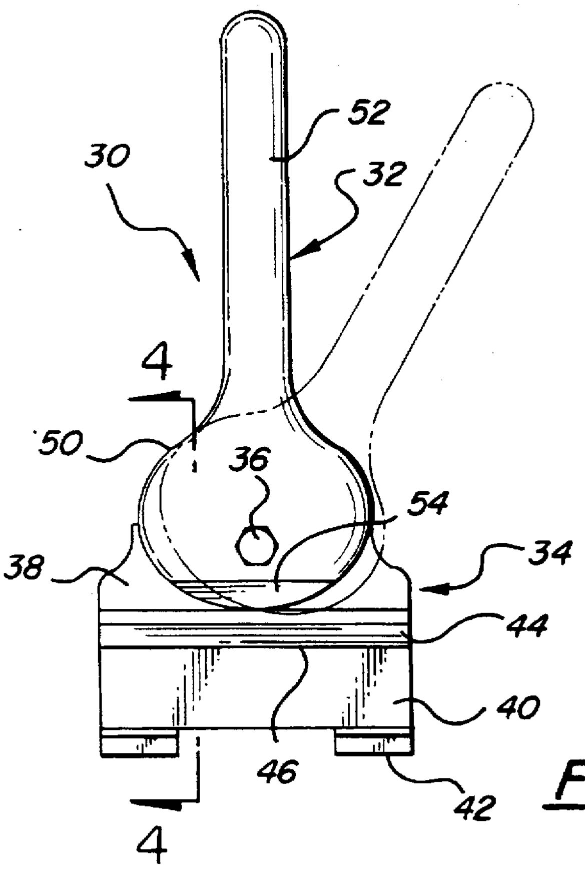
FIG. 3 is a front view of the insertion tool of FIG. 2.

An insertion tool 30, shown in FIG. 2–5, includes a handle 32 pivotally mounted on a base 34 by a bolt 36 to define a pivot axis 37. FIG. 3 shows the handle in upright position and, in phantom lines, in a partially rotated position. In FIG. 2, the handle is in the fully rotated position for complete insertion of the spring clamp. The handle and base are preferably made from hardened aluminum sheet stock about one half inch thick and machined to define particular features.

The base 34 has an upper body 38 containing the threaded end of the bolt 36 and a lower bracket 40 of thin section and terminating in two spaced feet 42. A clip 44 fastened in the upper portion of the bracket 40 has a nose or hook 46 extending toward the feet 42. As shown in FIG. 2, the hook 46 defines a niche defined by the hook 46 and the bracket 40 which fits over the top edge of the heat rail 16; the feet 42 fit under the lower surface of the heat rail.

The handle 32 comprises a pivot hole receiving the bolt 36 near one end, a cam 50 in the region of the pivot axis, and a lever 52 extending from the cam and comprising the other end of the handle. The edge of the cam furthest from the lever has a chamfer 54. The cam 50 is roughly circular with an eccentric axis so that with the lever 52 in upright position the outer cam surface 56 is maximally spaced from the feet 42 and as the lever is turned about the axis the cam surface 56 approaches the feet as shown in phantom lines in FIG. 2.

Figure 4:
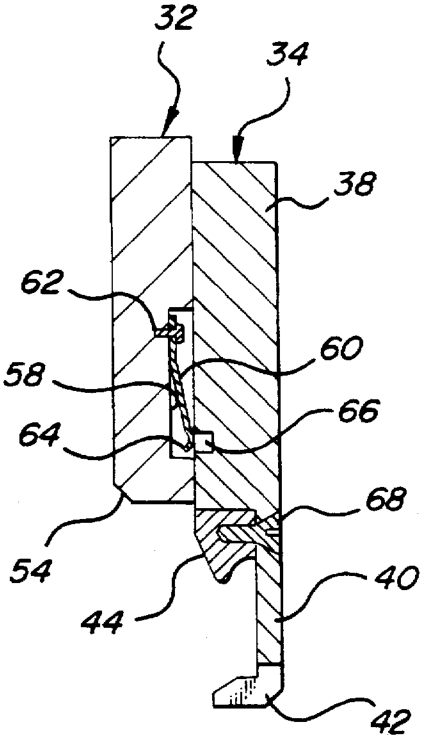
FIG. 4 is a cross section of the insertion tool taken along line 4—4 of FIG. 3.

The sectional view in FIG. 4 discloses a detent mechanism which holds the handle in upright position until a detent force is overcome. The side of the cam 50 adjoining the base 34 has a recess 58 on each side of the pivot axis. Each recess contains a leaf spring 60 attached at one end to the cam 50 by a small screw 62 and having a free end 64 which bears against the base 34. A detent recess 66 in the base recess on each side of the axis receives the end 64 of the spring when the handle is upright. FIG. 4 also shows the clip 44 secured to the bracket 40 by screws 68.

Figure 5:
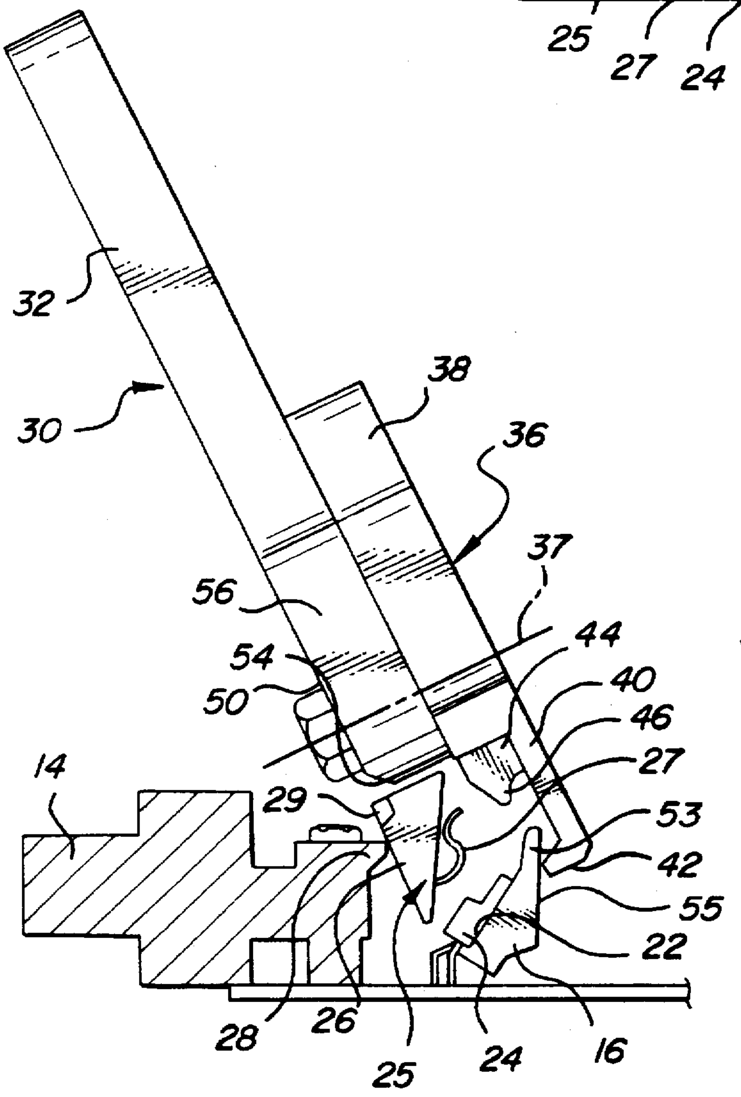
FIG. 5 is a modified cross section of the assembly of FIG. 1 taken along line 2—2 and including an insertion tool in a position ready for attachment.

To assemble the spring clamp 25 to the support, the spring clamp is positioned above the space between the header and the heat rail, as shown in FIG. 5, and the tool 30 is attached by first tipping it at an angle to engage the clip 44 over the upper edge 53 of the heat rail. In this position the chamfer 54 on the cam 50 allows the tool to clear the spring clamp. Upon hooking the clip over the upper edge, the tool is then rotated to an upright position so that the feet 42 fit under the rail 16 as shown in FIG. 2, with the inner surface of the bracket 40 in contact with the outer surface 55 of the heat rail 16. Since the upper body 38 of the base is thicker than the bracket 40, the handle 32 will be positioned over the spring clamp. Then by turning the lever, the cam 50 is forced against the spring clamp to press it into its latched position as indicated in FIG. 2. The feet 42, spaced on either side of the axis, prevent the base from tipping in the direction of lever rotation. The clip 44 which holds onto the upper edge of the heat rail prevents the tool from rotating outward due to the upward force developed on the cam 50. In this manner forty pounds of insertion force is applied to the spring clamp with only two or three pounds of force applied to the lever.

It will be seen that the tool is both inexpensive to make and easy to use, and it affords installation of the spring clamp without damage to parts.

The embodiments of the invention in which an exclusive property or privilege is claimed are defined as follows:

1. A tool for inserting a spring clamp into a support wherein the support has an outer wall having an upper edge and a lower surface, the tool comprising:

a base for attachment to the support;

a handle pivotally mounted on the base at a pivot axis; and means for pressing the spring clamp into the support comprising a cam on the handle positioned to engage and press on the spring clamp upon pivoting of the handle on the support; and the base includes a bracket for attachment to the outer wall of the support and having a hook portion for engaging the upper edge and feet spaced on either side of the axis for engaging the lower surface to prevent tipping of the tool during pivoting of the handle.

2. A tool for inserting a spring clamp into a support wherein the support has an outer wall and the spring clamp is inserted at a position spaced within the outer wall, the tool including:

a base for attachment to the support;

a handle pivotally mounted on the base at a pivot axis; and means for pressing the spring clamp into the support comprising a cam on the handle positioned to engage and press on the spring clamp upon pivoting of the handle on the support; and the base includes a thin bracket portion for attachment to the outer wall of the support and a thick body portion which overhangs the support for mounting the handle in alignment with the spring clamp position.

3. A tool for inserting a spring clamp into a support including a detent comprising:

a base for attachment to the support;

a handle pivotally mounted on the base at a pivot axis; and means for pressing the spring clamp into the support comprising a cam on the handle positioned to engage and press on the spring clamp upon pivoting of the handle on the support; and detent spring means and cooperating recess means on the handle and the base, whereby the spring means engages the recess means to releasably hold the handle in a preferred position relative to the base.

* * * * *